United States Patent
Ghosh et al.

(10) Patent No.: US 12,354,247 B1
(45) Date of Patent: Jul. 8, 2025

(54) SEAMLESS IMAGE INTEGRATION AND IMAGE PERSONALIZATION

(71) Applicant: Optimatik Inc., Los Angeles, CA (US)

(72) Inventors: Arnab Ghosh, London (GB); Mandela Patrick, Brooklyn, NY (US); Oleksii Sadliak, Lviv (UA); Roman Vei, Lviv (UA)

(73) Assignee: Optimatik Inc., Los Angeles, CA (US)

( * ) Notice: Subject to any disclaimer, the term of this patent is extended or adjusted under 35 U.S.C. 154(b) by 0 days.

(21) Appl. No.: 18/886,390

(22) Filed: Sep. 16, 2024

Related U.S. Application Data

(60) Provisional application No. 63/694,975, filed on Sep. 16, 2024.

(51) Int. Cl.
*G06T 5/00* (2024.01)
*G06T 3/40* (2006.01)
(Continued)

(52) U.S. Cl.
CPC .............. *G06T 5/77* (2024.01); *G06T 3/40* (2013.01); *G06T 5/50* (2013.01); *G06T 5/60* (2024.01); *G06T 7/11* (2017.01); *G06T 7/30* (2017.01); *G06T 7/70* (2017.01); *G06V 40/162* (2022.01); *G06T 2207/20081* (2013.01);
(Continued)

(58) Field of Classification Search
CPC ......... G06T 11/60; G06T 11/00; G06T 13/40; G06T 2200/24; G06T 2210/22; G06T 3/40; G06V 10/242; G06V 40/165
See application file for complete search history.

(56) References Cited

U.S. PATENT DOCUMENTS 10,049,477 B1 * 8/2018 Kokemohr ............ G06T 11/001
2015/0143209 A1 * 5/2015 Sudai ................... G06F 40/186
715/202

(Continued)

OTHER PUBLICATIONS

Zhang, Zhixing, et al. "Sine: Single image editing with text-to-image diffusion models." Proceedings of the IEEE/CVF Conference on Computer Vision and Pattern Recognition. 2023.*
(Continued)

*Primary Examiner* — Li Liu
(74) *Attorney, Agent, or Firm* — Fish & Richardson P.C.

(57) ABSTRACT

Methods, systems, and apparatus, including computer programs encoded on a computer storage medium, for generating an inpainted image of a replacement individual in the place of a reference individual in a reference image using a metadata comparison. In one aspect, a system comprises receiving a first image comprising one or more reference individuals and a second image comprising one or more replacement individuals; obtaining replacement metadata and reference metadata; determining, based on the obtained replacement metadata and reference metadata, at least one portion of the first image for replacing corresponding with the one or more reference individuals; and generating a third image that comprises a modification of the first image wherein the at least one portion of the first image is replaced with replacement content, the replacement content being generated based on (i) the one or more replacement individuals, (ii) the replacement metadata, and (iii) the reference metadata.

22 Claims, 8 Drawing Sheets

(51) Int. Cl.
*G06T 5/50* (2006.01)
*G06T 5/60* (2024.01)
*G06T 5/77* (2024.01)
*G06T 7/11* (2017.01)
*G06T 7/30* (2017.01)
*G06T 7/70* (2017.01)
*G06V 40/16* (2022.01)

(52) U.S. Cl.
CPC ............... *G06T 2207/20084* (2013.01); *G06T 2207/20132* (2013.01); *G06T 2207/20221* (2013.01); *G06T 2207/30201* (2013.01)

(56) References Cited

U.S. PATENT DOCUMENTS

| | | | | |
|---|---|---|---|---|
| 2017/0287136 | A1* | 10/2017 | Dsouza | ..................... G06T 7/11 |
| 2018/0047200 | A1* | 2/2018 | O'Hara | ................ G06V 10/242 |
| 2023/0230198 | A1* | 7/2023 | Zhang | .................... G06T 11/60 |
| | | | | 382/276 |
| 2023/0342893 | A1* | 10/2023 | Hinz | ........................ G06T 5/60 |
| 2024/0355010 | A1* | 10/2024 | Ahafonov | ............. G06T 11/001 |
| 2024/0355022 | A1* | 10/2024 | Shi | ......................... G06T 7/194 |

OTHER PUBLICATIONS

Murphy-Chutorian, Erik, and Mohan Manubhai Trivedi. "Head pose estimation in computer vision: A survey." IEEE transactions on pattern analysis and machine intelligence 31.4 (2008): 607-626.*

Wu, Weijia, et al. "Diffumask: Synthesizing images with pixel-level annotations for semantic segmentation using diffusion models." Proceedings of the IEEE/CVF International Conference on Computer Vision. 2023.*

Avrahami, Omri, Dani Lischinski, and Ohad Fried. "Blended diffusion for text-driven editing of natural images." Proceedings of the IEEE/CVF conference on computer vision and pattern recognition. 2022.*

Kirillov et al., "Segment anything," CoRR, Submitted Apr. 5, 2023, arXiv:2304.02643v1, 30 pages.

Niu et al., "Painterly Image Harmonization by Learning from Painterly Objects," CoRR, Submitted Dec. 15, 2023, arXiv:2312.10263v1, 14 pages.

Radford et al., "Learning transferable visual models from natural language supervision," CoRR, Submitted Feb. 26, 2021, arXiv:2103.00020v1, 48 pages.

Wang et al., "Towards Real-World Blind Face Restoration with Generative Facial Prior," CoRR, Submitted Jun. 11, 2021, arXiv:2101.04061v2, 11 pages.

Xie et al., "SegFormer: Simple and Efficient Design for Semantic Segmentation with Transformers," Advances in neural information processing systems, Submitted Oct. 28, 2021, arXiv:2105.15203v3, 18 pages.

Ye et al., "IP-Adapter: Text Compatible Image Prompt Adapter for Text-to-Image Diffusion Models,", CoRR, Submitted Aug. 13, 2023, arXiv:2308.06721v1, 16 pages.

Zhang et. al., "Adding Conditional Control to Text-to-Image Diffusion Models," CoRR, Submitted Nov. 26, 2023, arXiv:2302.05543v3, 12 pages.

* cited by examiner

SEAMLESS IMAGE INTEGRATION AND IMAGE PERSONALIZATION

CROSS-REFERENCE TO RELATED APPLICATION

This application claims the benefit of U.S. Provisional Application No. 63/694,975, filed Sep. 16, 2024, the contents of which are incorporated by reference herein.

BACKGROUND

This specification relates to processing data using machine learning models.

Machine learning models receive an input and generate an output, e.g., a predicted output, based on the received input. Some machine learning models are parametric models and generate the output based on the received input and on values of parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can generate an inpainted image of a replacement individual in the place of a reference individual in a reference image. In particular, the system can transform any input reference image to include one or more replacement individuals by altering the reference image based on a metadata comparison between metadata of the replacement and reference individuals.

In this specification, a reference image refers to an image including one or more reference individuals. For example, the reference image can contain a background or a scenario, e.g., a famous person on the red carpet, a sports star competing in an arena, a popular vacation destination, a fictional location from a movie or book, a meme, etc., that a user wants to modify to include the likeness of one or more replacement individuals in place of the reference individuals. More specifically, the system can allow for the personalization of a reference image to include the replacement individuals, e.g., in some cases, the replacement individual can be the user or someone the user knows.

The system can detect and identify segmentation masks of the reference individuals for inpainting using the metadata comparison. In this specification, inpainting refers to the process of replacing designated content, e.g., an identified grouping of pixels that belong to the same object, e.g., the skin, an article of clothing, etc., from the reference image with content from the replacement image. In particular, inpainting involves replacing the content from the reference image with replacement content in an aesthetically consistent manner such that it is difficult to tell that the resultant image was modified to include the replacement content.

In some cases, the system can generate a set of template images that can be used for further replacement. In particular, the set of template images can include example individuals with different skin tones and genders that were used to replace the reference individuals. As an example, the template images can be maintained by the system in a template image database, e.g., in the case one or more other users aims to replace content within the same reference image. In this case, the system can select one of the template images, e.g., based on the replacement metadata, for further processing. For example, the system can perform iterative personalization with the selected template image, e.g., to replace the template faces of the example individual with the faces of corresponding replacement individuals by blending the template faces with corresponding replacement faces in an iterative manner. In some examples, the system can also iteratively replace the template hair of the example individual with the replacement hair of the corresponding replacement individual by similarly blending the template hair with the replacement hair in an iterative manner.

According to a first aspect there is provided a computing-device implemented method for receiving a first image comprising one or more reference individuals and a second image comprising one or more replacement individuals, obtaining replacement metadata for each of the one or more replacement individuals, obtaining reference metadata for each of the one or more reference individuals, determining, based on the obtained replacement metadata and reference metadata, at least one portion of the first image for replacing, the at least one portion corresponding with at least one portion of the one or more reference individuals, and generating a third image that comprises a modification of the first image wherein the at least one portion of the first image is replaced with replacement content, the replacement content being generated based on (i) the one or more replacement individuals, (ii) the replacement metadata, and (iii) the reference metadata.

This and other systems and methods for seamless image integration described herein can have one or more of at least the following characteristics.

In some embodiments, the computing-device implemented method wherein determining the at least one portion of the first image for replacing comprises processing the first image using an object detection machine learning model to identify a region of the first image corresponding to each of the one or more reference individuals, extracting a plurality of segmentation masks from each identified region of the first image, performing a comparison of the replacement and reference metadata that relates to each identified region, and identifying one or more of the plurality of segmentation masks from each identified region as the at least one portion of the first image for replacing in accordance with the comparison.

In some embodiments, the computing-device implemented method wherein the plurality of segmentation masks comprise segmentation masks representing face, skin, hair, and one or more articles of clothing.

In some embodiments, the computing-device implemented method wherein identifying one or more of the plurality of segmentation masks comprises identifying one or more segmentation masks based on at least one discrepancy between the replacement and reference metadata as the at least one portion of the first image for replacing.

In some embodiments, the computing-device implemented method wherein generating the third image comprises obtaining a cropped image from the second image comprising a replacement individual, and generating the third image from a model input comprising the first image, the cropped image, the at least one portion of the first image for replacing, and a text prompt comprising the replacement metadata using an inpainting machine learning model.

In some embodiments, the computing-device implemented method wherein the at least one portion of the first image for replacing comprises one or more segmentation masks.

In some embodiments, the computing-device implemented method wherein the inpainting machine learning model is a stable diffusion machine learning model.

In some embodiments, the computing-device implemented method wherein obtaining the cropped image from the second image further comprises identifying a region of the second image comprising the replacement individual from the second image using an object detection machine learning model, and cropping the region of the second image comprising the replacement individual to generate the cropped image.

In some embodiments, the computing-device implemented method further comprises resizing the cropped image in accordance with the at least one portion of the first image for replacing.

In some embodiments, the computing-device implemented method wherein generating the third image further comprises generating a pose for each of the one or more reference individuals from the first image using a pose estimation machine learning model, and conditioning the generation of the third image using the pose.

In some embodiments, the computing-device implemented method wherein detecting the replacement metadata of the one or more replacement individuals comprises generating the replacement metadata by processing the second image using a metadata machine learning model, and wherein detecting the reference metadata of the one or more reference individuals comprises generating the reference metadata by processing the first image using the metadata machine learning model.

In some embodiments, the computing-device implemented method wherein the second image is selected from a set of example individual images, wherein the replacement individuals are example individuals, wherein the replacement metadata is template metadata, and wherein the third image comprises a generated template image.

In some embodiments, the computing-device implemented method further comprises generating a corresponding set of template images for each example individual image in the set of example individual images, and storing the set of template images and the template metadata in a template image database.

In some embodiments, the computing-device implemented method wherein generating the corresponding set of template images further comprises upsampling each template image in the set of template images using an upsampling model.

In some embodiments, the computing-device implemented method wherein identifying one or more of the plurality of segmentation masks comprises extracting a reference face segmentation mask for each reference individual face.

In some embodiments, the computing-device implemented method further comprising extracting a replacement face segmentation mask for each replacement individual face, and replacing a reference face with a corresponding replacement face using a respective pair of reference face segmentation mask and corresponding replacement segmentation mask for each reference individual.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

According to a second aspect, there is provided a computing-device implemented method for obtaining a template image comprising one or more template individuals, receiving a replacement image comprising one or more corresponding replacement individuals, for each template individual in the template image, identifying a bounding box around a template face of the template individual, and in an iterative manner, replacing the template face with a replacement face of a corresponding replacement individual.

This and other systems and methods for iterative face replacement described herein can have one or more of at least the following characteristics.

In some embodiments, the computing-device implemented method wherein each template individual provides a likeness to each of the one or more corresponding replacement individuals in the replacement image, and wherein obtaining the template image further comprises obtaining template metadata for each of the one or more template individuals, obtaining corresponding replacement metadata for each of the one or more corresponding replacement individuals, and identifying the template image from a set of template images stored in a template database using the template metadata and the corresponding replacement metadata.

In some embodiments, the computing-device implemented method wherein obtaining the template image further comprises, in response to determining that the template image is not in the template database, generating the set of template images comprising the template image.

In some embodiments, the computing-device implemented method wherein replacing the template face with a replacement face of a corresponding replacement individual in an iterative manner comprises identifying a bounding box around the replacement face of the corresponding replacement individual, aligning the template image and the replacement image by overlapping the bounding box around the template face with the bounding box around the replacement face, blending the replacement face and the template face at each of a number of iterations, wherein blending comprises determining a discrepancy between an embedding of the replacement face and an embedding of the template face, determining whether the discrepancy satisfies a threshold criteria, in response to determining that the discrepancy satisfies the threshold criteria, blending the replacement face with the template face using a blending function parameterized by a blending parameter value, and updating the blending parameter value based at least on the discrepancy.

In some embodiments, the computing-device implemented method wherein updating the blending parameter value based at least on the discrepancy comprises increasing the blending parameter value if the discrepancy is less than a blending threshold value, or decreasing the blending parameter value if the discrepancy is greater than the blending threshold value.

In some embodiments, the computing-device implemented method wherein blending the replacement face with the template face at each of the number of iterations further comprises upsampling an intermediate image using a face restoration model to generate an upsampled image.

In some embodiments, the computing-device implemented method wherein blending the replacement face with the template face further comprises, at a final iteration, harmonizing the upsampled image using a harmonizer model.

In some embodiments, the computing-device implemented method, wherein harmonizing the upsampled image using the harmonizer model comprises detecting a foreground of the upsampled image comprising the template individual with the replacement face, detecting a background of the template image, and generating a harmonized image from the detected foreground and background using the harmonizer model, wherein the harmonized image comprises a unified foreground of the upsampled image and the background of the template image.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages.

Photo editing provides users with the ability to generate retouched and recomposed images. In some cases, a user can seek to include themselves or someone they know or know of in a reference image in place of one or more reference individuals. This process can be computationally-intensive and time-consuming, especially in the case of replacing multiple reference individuals, since the user is required to make tailored edits for each individual according to the shared characteristics and differences the user determines between the replacement individual they intend to include and the reference individual that appears in the reference image.

In contrast, the system of this specification enables the seamless integration of replacement individuals into reference images based on a metadata comparison between the replacement and reference individuals. In particular, the system can leverage the identification of specific portions of the image to inpaint based on the metadata comparison, e.g., since inpainting involves processing high-resolution images with a complex neural network architecture over multiple iterations, which can be a computationally-intensive and memory-intensive generative task. More specifically, performing the metadata comparison can reduce the computational resources required to replace the reference content by identifying which segmentation masks to inpaint based on the metadata comparison, which the limits the content that needs to be generated to directed portions of the reference image.

Moreover, by framing the photo editing process as the replacement of specific reference content with replacement content, the system can leverage useful aspects of the reference image, e.g., relevant structural information, to condition the inpainting model and enhance the quality of the generated inpainted image. In particular, rather than receiving a text prompt that specifies the generation of an image and generating the image without supporting data, the system can leverage the geometry of the reference individuals to preserve key individual placement and pose details in the generated image. This can prove especially useful in the case of multi-person image generation, which can involve complex spatial relationships, e.g., as part of one or more interactions between individuals. In general, generative models can be more prone to hallucination, e.g., incoherent or anatomically incorrect generation, for multi-object images because they can conflate the associations between objects or the placement of objects relative to each other. In contrast, the system of this specification allows for the targeted replacement of reference content with corresponding replacement content, thereby preserving the underlying relationships between multiple individuals in a reference image.

In addition, the system allows for the creation of a set of template images that can be maintained, e.g., in a template image database, for replacing in the case that one or more other users inputs the same reference image into the system. For example, the system can leverage one or more graphics processing units (GPUs) on a central server to generate a set of template images using a representative set of example individuals of a variety of skin-tones and genders that can be stored and accessed for personalization. In particular, the system can perform an iterative personalization using the replacement image and a selected template image. In contrast to repetitively processing the same reference image and inpainting each time the reference image is received (a relatively computationally expensive process), the system can select the template image that provides a likeness to the one or more replacement individuals, e.g., by identifying the template image using the metadata, and can perform an iterative faceswapping (a relatively computationally cheaper process) on the portion of the template image that relates to the face, e.g., directly on a central processor on a user device. In some cases, the system can additionally perform iterative hair-replacing to further personalize the image, e.g., also directly on the central processor. Furthermore, the system can reduce image generation latency by storing the template images for further replacing, e.g., since the system can perform the iterative personalization separately from the template image generation, thereby supporting the ability of the system to scale to many users.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
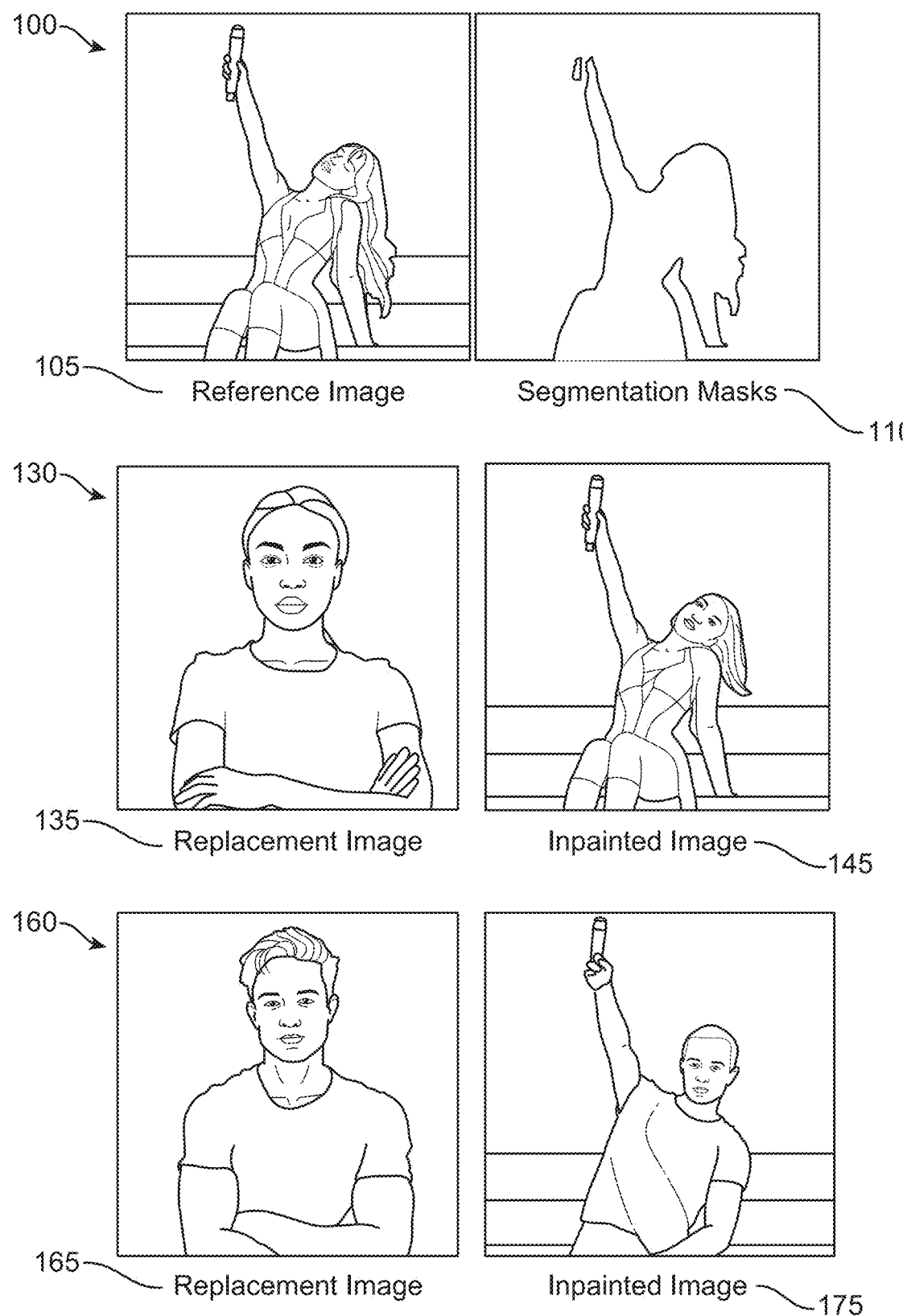
FIG. 1 is an example of inpainted images including one replacement individual that were generated using a metadata comparison.

FIG. 1 depicts example inpainted images generated for a reference image including a single reference individual, e.g., a famous singer performing on tour. For example, a system implemented using the techniques of this specification can generate an inpainted images 145 and 175 using a metadata comparison and an inpainting model. In this case, the inpainted image 145 includes a replacement individual of the same gender but a different skin-tone than the reference individual, and the inpainted image 175 includes a replacement individual of a different gender, but same skin-tone as the reference individual.

Panel 100 depicts an example segmentation mask 110 that the system can generate from the reference image 105. In particular, the system can extract segmentation masks 110 corresponding to the reference individual, e.g., using a segmentation model. While the segmentation masks 110 are depicted here as the segmentation mask for the whole individual, the system can also detect segmentation masks for the reference individual's face, skin, hair, and articles of clothing.

Panels 130 and 160 depict example replacement images 135, 165 and the respective generated inpainted images 145, 175. The system can detect the metadata of the reference image 105, the replacement image 135, and replacement image 165 to identify the relevant segmentation masks 110 for replacing. As an example, since the gender of the replacement individual in the replacement image 135 matches the gender of the reference individual in the reference image 105, but the skin-tone does not match, the system can use the discrepancy between the replacement and reference metadata to determine that the skin segmentation mask should be inpainted in resultant inpainted image 145. In this case, the replacement individual in the replacement image 135 maintains the same outfit, e.g., the dress, as the reference individual, e.g., since the gender of the replacement individual matches the gender of the reference individual according to the metadata comparison.

As another example, since the gender of the replacement individual in the replacement image 165 does not match the gender of the reference individual in the reference image 105, but the skin-tone does match, the system can use the discrepancy in metadata to determine that article of clothing segmentation masks should be inpainted in resultant inpainted image 175. In this case, the inpainted image 175 includes the replacement individual in a new outfit, but in the same scenario as the reference image 105. In some cases, this inpainting of a new outfit can be useful for preventing the undesired depiction, e.g., of a male replacement individual in a women's outfit or vice versa. However, in other cases, the inpainting of clothing segmentation masks based on a discrepancy between the gender of the replacement individual and reference individual can be optional.

Figure 2:
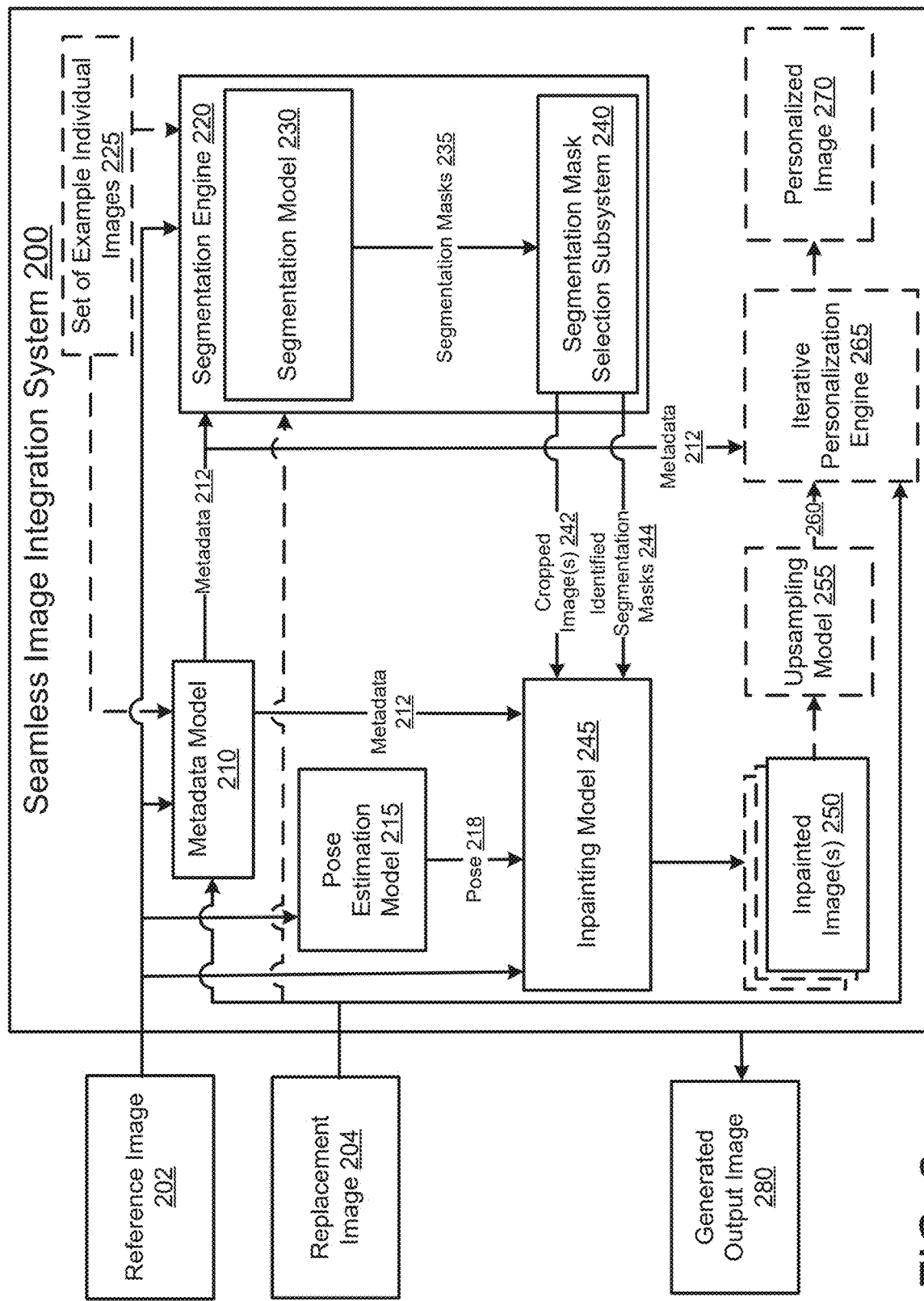
FIG. 2 is a system diagram of an example seamless image integration system that includes an iterative personalization engine.

The inpainted images 145 and 175 can be generated by a seamless image integration system that can detect metadata, extract segmentation masks, and identify the segmentation masks for inpainting based on a metadata comparison. FIG. 2 shows an example seamless image integration system 200, e.g., that can be used to generate the inpainted images of FIG. 1. The seamless image integration system 200 is an example of a system implemented as computer programs on one or more computers in one or more locations in which the systems, components, and techniques described below are implemented.

For example, the seamless image integration system 200 can generate an inpainted image including a replacement individual from a replacement image 204 in the place of a reference individual in a reference image 202. In particular, the system 200 can process the reference image 202 including one or more reference individuals and the replacement image 204 including one or more replacement individuals and can generate an inpainted image 250 where the replacement individuals have replaced the reference individuals in an aesthetically consistent manner.

As an example, the reference image 202 can be an image including one or more famous individuals, e.g., a famous singer, a movie star, a politician, etc., and the replacement image 204 can include one or more of a user of the system 200, someone the user knows, e.g., a friend, a family member, a coworker, or knows of. In some cases, the system can process multiple replacement images 204, e.g., in the case that a user inputs separate replacement images for each replacement individual. In particular, the reference image 202 can include a background or scenario that a user wants to modify to include the likeness of one or more replacement individuals in, e.g., a scene from a movie, a top vacation destination, a meme, etc.

The system 200 can allow for the personalization of a reference image 202 to include the replacement individuals. As an example, the system 200 can be used by a number of users to support the generation and sharing of personalized inpainted images, e.g., as a social media platform for sharing memes or images of virtually tried-on outfits.

The system 200 can process the reference image 202 and the replacement image 204 using a metadata model 210 to generate metadata 212, e.g., the reference metadata pertaining to the one or more reference individuals of the reference image 202 and the replacement metadata pertaining to the one or more replacement individuals of the replacement image, that can be used to inform the generation of the inpainted image 250.

The metadata model 110 can have one or more appropriate machine learning architecture, e.g., a neural network, that can be configured to process an image, e.g., the reference image 202 and the replacement image 204, and detect one or more metadata fields with respect to the one or more individuals in the images 202, 204. As an example, the races and genders of the individuals in the images 202, 204 can be metadata fields. As another example, the age group, facial expression, and height can be metadata fields. In particular, the metadata model 210 can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

In some cases, the metadata model 210 can additionally detect a bounding box around the replacement individual in the replacement image 204, the reference individual in the reference image 202, or both and can provide the bounding box coordinates as an output. For example, the metadata model 210 can be implemented as a contrastive language-image pretraining model, e.g., CLIP, as described in Radford, A., et. al. "Learning Transferable Visual Models From Natural Language Supervision" (arXiv:2103.00020v1).

The system 200 can use the metadata 212 to determine which portions of the reference image 202 can be replaced by content from the replacement image 204. In particular, the system 200 can process the metadata 212 using a segmentation engine 220 that includes a segmentation model 230 configured to generate segmentation masks 235 for each of the individuals in the reference image 202 and the replacement image 204.

In this context, a segmentation mask refers to a grouping of pixels that are detected to be associated together, e.g., as part of the same object, in an image. For example, the segmentation model 230 can process an image, e.g., the reference image 202 or the replacement image 204, to detect segmentation masks representing face, skin, hair, and articles of clothing for each individual in the image. In particular, each segmentation mask can represent the boundary of the face, skin, hair, or clothing object, e.g., with respect to other objects in the image. For example, the segmentation model 230 can detect the background of an image, glasses, articles of clothing worn on the upper body, articles of clothing worn on the lower body, a left shoe, a pair of shoes, the right-arm, face, bag, etc.

The segmentation engine 220 can detect segmentation masks 235 using a segmentation model 230. For example, the segmentation model 230 can have any appropriate machine learning architecture, e.g., a neural network with any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers). In particular, the segmentation model 230 can be implemented as a computer vision model configured to perform object detection, e.g., a convolutional neural network or vision transformer.

In some cases, the segmentation model 230, can be implemented as a multi-stage machine learning model, e.g., including two or more machine learning models, to modularize the detection of objects, generation of segmentation masks, and classification of masks into separate models with different training tasks. As an example, the segmentation model 230 can be implemented as a Segment Anything Model (SAM), e.g., as described in Kirillov, A., et. al. "Segment Anything" (arXiv:2304.02643v1). As another example, the segmentation model 230 can be implemented as a SegFormer model, e.g., as described in Xie, E., et. al. "SegFormer: Simple and Efficient Design for Semantic Segmentation with Transformers" (arXiv:2105.15203v3).

In particular, the segmentation engine 220 can process the reference image 202 using the segmentation model 230 to generate a set of segmentation masks 235 for each reference individual in the reference image 102 and can process the replacement image 204 using the segmentation model 230 to generate a set of segmentation masks 235 for each replacement individual 204 in the replacement image. The system 200 can then select at least one portion of the reference image 202 for replacing, e.g., using the segmentation masks 235 to designate which segmentation masks 235 pertaining to each individual can be designated for replacing. In particular, the system 200 can process the segmentation masks 235 and the metadata 212 using a segmentation mask selection subsystem 240 to determine which portions of the reference image 202 to designate for replacing with replacement content.

For example, the segmentation mask selection subsystem 240 can perform a comparison between the metadata 212 of each reference-replacement individual pair to identify whether or not to designate a given segmentation mask for inpainting using replacement image 204 content. The subsystem 240 can first determine the reference-replacement individual pair, e.g., based on an additional user input specifying the pairs, a set of rules specifying the pairs, or both. More specifically, for a particular reference-replacement individual pair, the segmentation mask selection subsystem 240 can identify one or more segmentation masks 244 based on a discrepancy between the reference metadata and the replacement metadata, e.g., mismatched genders, races, etc.

In particular, the metadata 212 output from the metadata model 210 can be configured to be in a format that facilitates element-wise metadata comparison, e.g., an ordered list, a dictionary, etc., and the system 200 can determine whether or not the replacement and reference metadata are element-wise equivalent using the subsystem 240. For example, the segmentation mask selection subsystem 240 can compare the detected genders of each reference-replacement individual and if they are not the same, the subsystem 240 can identify the segmentation masks that can be inpainted with replacement content based on the differences. In this case, the subsystem 140 can determine that a segmentation mask representing a skirt worn by a reference individual can be inpainted for a male replacement individual. In another case, the subsystem 140 can determine that a segmentation mask representing the skin of a reference individual can be inpainted for a replacement individual with a different skin tone.

In some cases, the system 200 can be configured using one or more user-defined parameters, e.g., to override default settings of the segmentation mask selection subsystem 240. For example, in this case, a user can elect to not inpaint article of clothing content for articles of clothing associated with a different gender. As another example, a user can elect to inpaint article of clothing content even for articles of clothing associated with a reference individual of the same gender.

In some cases, the segmentation model 130, or another object detection model, e.g., the metadata model 210 in the case that the metadata model additionally generates a bounding box around each individual in the reference image 202 and the replacement image 204, can identify the region(s) of the replacement image 202 that include the one or more replacement individuals. In this case, the segmentation engine 220 can crop the replacement image 202 to generate cropped image(s) 242 around the regions that include each of the replacement individual(s), e.g., to remove unnecessary background information. In some cases, the system 200 can additionally resize the cropped image(s) 242, e.g., to ensure that the cropped image(s) 242 are similarly-sized to the at least one portion of the reference image 202 that the cropped image(s) 242 will be used for replacing. For example, the system 200 can resize the cropped image(s) 242 to ensure that the size of the replacement individual's face in the cropped image is similar to the size of the reference individual's face.

The system 200 can then process the reference image 202, the one or more identified segmentation masks 244, the cropped image(s) 242, and the metadata 212 using an inpainting model 245 to generate an inpainted image 250, e.g., an image that includes the replacement content in the identified portion of the reference image 202 in an aesthetically consistent manner. As an example, the system 200 can provide, e.g., to a user, the inpainted image 250 as the generated output image 280.

The inpainting model 245 can have one or more appropriate machine learning architecture, e.g., a neural network with any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers). In particular, the inpainting model 245 can be implemented as a generative machine learning model configured for image generation, e.g., a generative-adversarial network, a convolutional neural network, an autoregressive language processing network, or a diffusion neural network.

For example, the inpainting model 245 can be a stable diffusion neural network that is configured to sequentially refine an initial state representing the reference image 202, the cropped image(s) 242, the identified segmentation masks 244, and the metadata 212 through a sequence of transformations that add noise to a data sample to generate each inpainted image 250. In some cases, the inpainting model 245 can be implemented as a latent diffusion model that includes an encoder block to map images to a lower-dimensional latent space before applying the sequence of transformations and a decoder block to map from the lower-dimensional latent space back into image space. As an example, the inpainting model 245 can be implemented as a U-Net that includes skip connections that allow the model 245 to combine both coarse features from the beginning of the sequence of transformations and fine features from the end of the sequence of transformations to improve the generated image quality.

As another example, the inpainting model 245 can have a recurrent neural network architecture that is configured to sequentially process the reference image 202, the cropped image(s) 242, the identified segmentation masks 244, and the metadata 212 and has been trained to perform next element prediction, e.g., to define a likelihood score distribution over a set of next elements. More specifically, the inpainting model 245 can include one or more of a recurrent neural network (RNN), long short-term memory (LSTM), or gated-recurrent unit (GRU). As another example, the inpainting model 245 can be transformer-based, e.g., an encoder-decoder transformer, encoder-only transformer, or a decoder-only transformer.

In some cases, the inpainting model 245 can be conditioned on one or more inputs, e.g., inputs that provide guidance that informs the generation of the template replacement images 250. As an example, the inpainting model 245 can be conditioned on a text prompt including the replacement metadata, e.g., the target metadata for the generated image. For example, the text prompt can instruct the inpainting model 245 to generate an inpainted image 250 with the characteristics of the replacement metadata using the identified segmentation masks 244. In some cases, the system 200 can process the replacement metadata using an image prompt adapter configured to generate effective prompts for the inpainting model, e.g., by augmenting the inpainting model 245 with IP Adapter, e.g., as described in Ye, H., et. al. "IP-Adapter: Text Compatible Image Prompt Adapter for Text-to-Image Diffusion Models" (arXiv:2308.06721v1).

As another example, the inpainting model 245 can be conditioned on a pose 218 of the one or more reference individuals in the reference image 202, e.g., the position and orientation of the reference individual in the reference image 202, e.g., based on the arrangement of the reference individual's joints and limbs, to provide a structural input characterizing the position and orientation that the replacement individual can take in the inpainted image 250. In particular, the system 200 can augment the inpainting model 245 with ControlNet to condition using the pose 218, as described in Zhang, L., et. al. "Adding Conditional Control to Text-to-Image Diffusion Models" (arXiv:2302.05543v3).

In this case, the system 200 can process the reference image 202 using a pose estimation model 215 configured to generate the pose 218 of the one or more reference individuals. The pose estimation model 215 can have any appropriate machine learning architecture, e.g., a neural network with any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

In some examples, instead of processing the replacement image 204 as described previously, the segmentation engine 220 can process each image in a set of example individual images 225, e.g., a set of images that include example individuals with representatively diverse skin-tones and genders, as a proxy replacement image. In this case, the system 200 can process the set of example individual images 225 to generate identified segmentation masks 244 and cropped image(s) 242 for each permutation of the example individuals as reference individuals that can be processed using the inpainting model 245 to generate inpainted image(s) 250 that can be used as template images, as will be explained in more detail below.

In particular, the system 200 can process each example individual image in the example individual image set 225 (i) using the metadata model 210 to generate respective template metadata and (ii) using the segmentation model 230 to generate respective segmentation masks 235 and cropped image(s) 242 for each of the example individuals as proxy replacement individuals. The system 200 can then process the respective segmentation masks 235 and metadata 212 using the segmentation mask selection subsystem 240 to determine the relevant cropped image(s) 242 and identified segmentation masks 244 for the permutations of example individuals as reference individuals.

For example, in the case that the reference image 202 includes two reference individuals and the example individual image set 225 includes a representatively-diverse set of three male images and three female images, the system 200 can calculate the respective identified segmentation masks 244 for each permutation of the replacement individuals as each of the reference individuals in the reference image 202. In this case, the system 200 can use the segmentation mask selection subsystem 240 to define a set of 36, e.g., 6*6, identified segmentation masks 244 for each possible ordered combination of the example individuals as reference individuals.

The system 200 can then process the respective identified segmentation masks 244, corresponding cropped image(s) 242, e.g., the cropped image(s) 242 for each example individual chosen as proxy replacement individual associated with the respective identified segmentation masks 244, corresponding metadata 212, and the reference image 202 for each combination to generate a corresponding set of inpainted image(s) 250 that can be used as a set of template images for further processing, e.g., personalization by faceswapping, hair-replacing, or both, as will be described in more detail below.

In the particular example depicted, the system 200 can generate the inpainted image(s) 250 using the inpainting model 245 and can upsample, e.g., increase the resolution and quality of, the inpainted image(s) 250 using an upsampling model 255. The upsampling model 255 can have one or more appropriate machine learning architecture, e.g., a neural network with any number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

In the case that the segmentation engine 220 processes the replacement image 204, e.g., as opposed to the example individual image set 225, and the inpainting model 245 generates an inpainted image 250 that includes the replacement individual, e.g., as opposed to a proxy replacement individual from the set of example individual images 225, the system 200 can use the upsampling model 255 to generate an upsampled image 260, e.g., which can be provided, e.g., to the user, as the generated output image 280.

In some cases, the upsampled image 260 is an upsampled template image 260. More specifically, in the case that the segmentation engine 220 processed the set of example individual images and generated a corresponding set of inpainted images 250 for each permutation of the example individuals as the one or more replacement individuals, the one or more replacement individual(s) of the replacement image 204 are not yet included in the inpainted image(s) 250, and therefore not in the upsampled image(s) 260.

More specifically, the upsampled image(s) 260 can be considered as a set of upsampled template images that include the example individuals in place of the reference individuals. In this case, the system 200 can replace, for each template individual, e.g., the example individual that replaced the reference individual of the reference image 202 as a proxy replacement individual, a segmentation mask representing the template face of the template individual with the corresponding segmentation mask representing the replacement face of the replacement individual, e.g., using an iterative personalization engine 265.

For example, the iterative personalization engine 265 can process the set of template images, e.g., the upsampled template images 260, to select a template image using the metadata 112. In particular, the iterative personalization engine 265 can identify a likeness between the template individuals and the replacement individuals of the replacement image 204, can identify bounding boxes around both the template face(s) and the replacement face(s), e.g., rectangular borders that define the location of the face(s) in the respective images, and can replace the template face(s) with the replacement face(s) by blending the template and replacement faces together in an iterative manner. In this case, the system 200 can generate a personalized image 270 that can be provided to the user as the generated output image 280. As an example, the system 200 can apply a blending algorithm parameterized by an updatable blending value parameter at each of a number of blending iterations, e.g., as will be described in further detail with respect to the example iterative personalization engine of FIG. 3.

In some cases, the upsampled template images 260 can be maintained in a template image database, e.g., for replacing by one or more other users. In particular, in the case that the system 200 is used by a number of users, the system 200 can store a set of template images for each reference image 202 received by the system 200. In the case that the user or another user inputs the same reference image, e.g., the reference image 202, the system 200 can identify a previously generated set of template images for faceswapping, hair-replacing, or both to generate the personalized image 270. By storing template images generated by replacing one or more example individuals as proxy replacement individuals in the reference image 202, the system 200 can reduce the latency required to generate each output image 280, thereby supporting the ability of the system 200 to scale.

Figure 3:
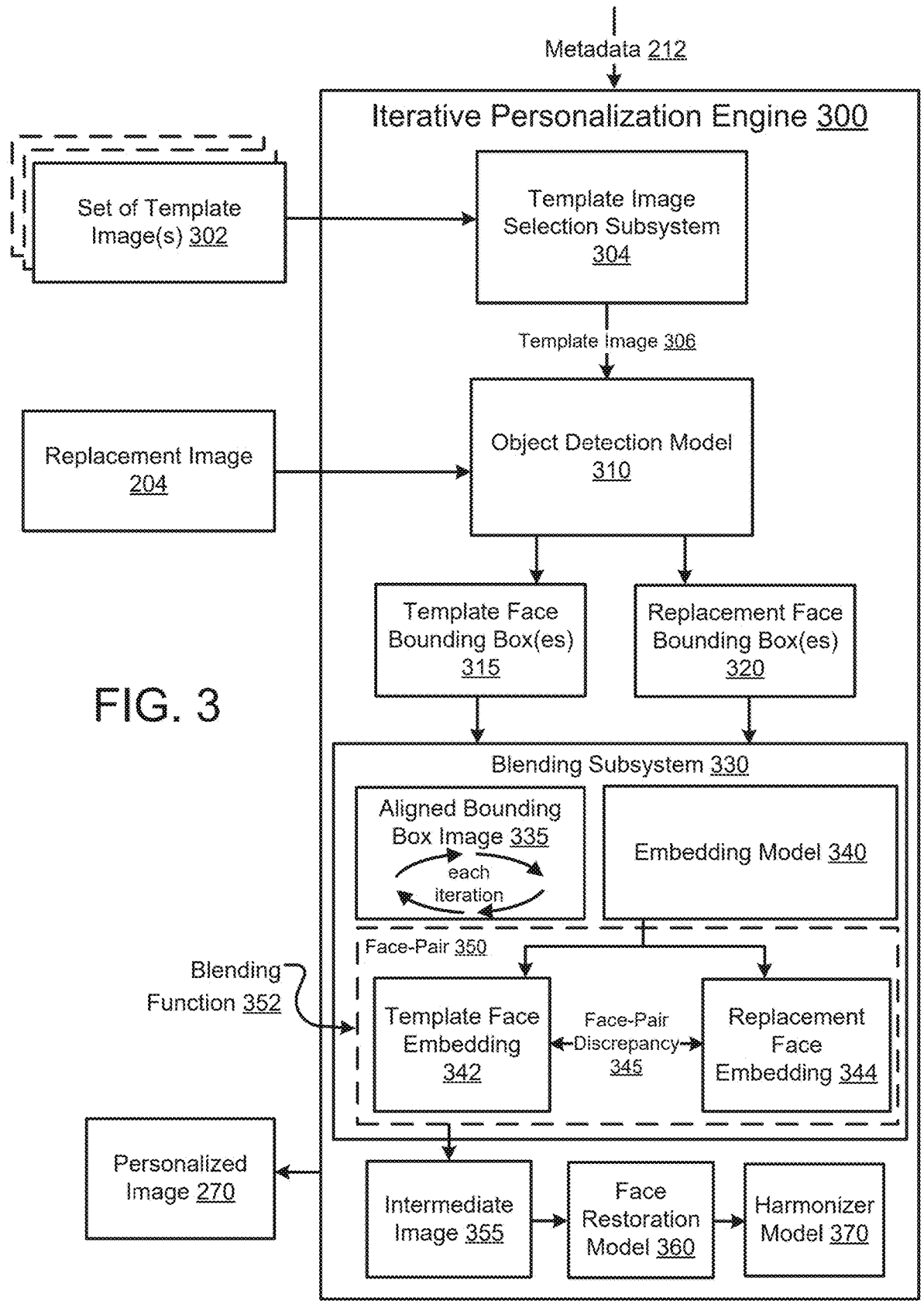
FIG. 3 is a system diagram of an example iterative personalization engine, e.g., the iterative personalization engine of the seamless image integration system of FIG. 2.

As an example, the system 200 can be implemented on a central server and on a number of user devices. In particular, the system 200 can generate and maintain, e.g., in the template image database, each set of template images for each new reference image received on the central server, e.g., using one or more graphical processing units (GPUs) to increase the efficiency of generating the set of template images. In this case, the iterative personalization engine 265 can be implemented on each user device and the system 200 can identify a relevant template image in the database to transmit to a user device from the central server, e.g., based on the metadata 212. The system 265 can then generate the personalized image 270 as the generated output image 280 directly on the user device, e.g., using one or more GPUs or computational processing units (CPUs) located on the user device FIG. 3 is a system diagram of an example iterative personalization engine. In the particular example depicted, personalization refers to faceswapping, e.g., replacing the template faces of the example individuals in a selected template image with the faces of corresponding replacement individuals in a replacement image to generate an aesthetically consistent personalized image 270. As an example, the iterative personalization engine 265 of the seamless image integration system 200 of FIG. 2 can be implemented as the iterative personalization engine 300.

The iterative personalization engine 300 can process a set of template images 302, the metadata 212, and a replacement image 204 to generate a personalized image 270 that includes the one or more replacement faces of the replacement image 104 on the template individuals of a selected template image. For example, the set of template images 302 can include a representative set of example individuals with different skin tones and genders as proxy replacement individuals for each of the one or more reference individuals, the metadata 212 can include replacement metadata characterizing the replacement individuals and template metadata characterizing the template individuals, and the replacement image 204 can include the user of the system, someone the user knows, or someone the user knows of.

In particular, the system can obtain the set of template image(s) 302 that include permutations of example individuals, e.g., from a set of example individual images 225, as template individuals. In some cases, the system can have generated the set of template image(s) 302 directly preceding the use of the iterative personalization engine 300, e.g., by processing the set of example individual image(s) 225 using the segmentation engine 220 and inpainting model 245 of FIG. 1. In other cases, the system can obtain the set of template image(s) 245, e.g., by identifying the set of template image(s) 245 in a template image database.

The iterative personalization engine 200 can process the set of template image(s) 302 and the metadata 212 using a template image selection subsystem 304 to identify the relevant template image 306 with respect to the replacement image 204. In this case, the relevant template image 306 includes one or more example individuals that provide a likeness to the one or more replacement individuals of the replacement image 204. Since the set of template image(s) 302 includes permutations of example individuals, the system can use the metadata 212 to determine which template image 306 to use for the faceswap.

For example, the system can perform a metadata comparison by comparing the metadata for each example-replacement individual pair that can be made between the individuals in the replacement image 204 and each template image in the set of template images 302. For a particular example-replacement individual pair, the template image selection subsystem 304 can identify the discrepancy between the respective example individual metadata and the respective template individual metadata, e.g., based on mismatched genders, races, etc. The template image selection subsystem 304 can evaluate the metadata comparison for each example-replacement individual pair in each template image to determine whether the template image provides a likeness to the replacement individuals. As an example, after evaluating the metadata comparison for each template image in the set of template image(s) 302, the subsystem 304 can select the template image 306 that has the greatest example-replacement individual metadata similarity, e.g., the lowest metadata discrepancy.

The iterative personalization engine 300 can then process the selected template image 306 and the replacement image 304 using an object detection model 310 to detect bounding boxes around each template individual face and each replacement individual face. In this context, bounding boxes are rectangular borders that define the spatial location of the respective template individuals' and replacement individuals' faces. In particular, the iterative personalization engine 300 can process the template image 306 using the object detection model 310 to generate template face bounding box(es) 315 and can process the replacement image 304 using the object detection model 310 to generate replacement face bounding box(es) 320.

The object detection model 310 can have any appropriate machine learning architecture, e.g., a neural network, that can be configured to process an image and detect a bounding box, e.g., the coordinates that define the bounding box, around the face of each individual in the image, e.g., the template face bounding box 315 and the replacement face bounding box 320. In particular, the object detection model 310 can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers). For example, the object detection model 310 can be a CNN, EfficientNet, ResNet, YOLO model, etc.

The iterative personalization engine 300 can use the template face bounding box 315 and the replacement face bounding box 320 to blend the template face and the replacement face at each of a number of blending iterations using a blending subsystem 330. In some cases, e.g., when there is more than one template-replacement face-pair to blend, the engine 300 can extract each portion of the template image 306 within the respective template face bounding box(es) 315 and each portion of the replacement image 304 within the replacement face bounding box(es) 320 to perform the faceswapping separately for each template-replacement face-pair. In this case, the engine 300 can overlap and blend the respective replacement face and the respective template face using the blending subsystem 330 and can replace the blended face portions in the template image to generate the personalized image 270.

For example, for each template-replacement face-pair, the blending subsystem 330 can overlap the bounding boxes, e.g., by aligning the coordinates of the template face bounding box 315 and the replacement face bounding box 320. In the particular example depicted, the blending subsystem 330 can generate an aligned bounding box image 335 that can be further processed at each of a number of blending iterations to perform the faceswapping.

At each iteration, and for each template-replacement face-pair 350, the blending subsystem 330 can generate a template face embedding 342 and a replacement face embedding 344, e.g., using an embedding model 340, can determine a face-pair discrepancy 345 between the template face 342 and replacement face 344 embeddings, and can apply a blending function 352 to the aligned bounding box image 335 based on the face-pair discrepancy 345 between the template face 342 and replacement face 344 embedding to blend together each template face and the replacement face in the template-replacement face-pair 350.

As an example, at the first iteration, the blending subsystem 330 can extract and process the portion of the template image within the template face bounding box(es) 315 and the portion of the replacement image within the replacement face bounding box(es) 320 using the embedding model 340 to generate a template face embedding 342 and a replacement face embedding 344, respectively. At each of the following iterations, the blending subsystem 330 can extract and process the portion of the aligned bounding box image 335 that pertains to the template face and the replacement face, respectively, using the embedding model 340 to generate an updated template face embedding 342 and an updated replacement face embedding 344.

The embedding model 340 can have one or more appropriate machine learning architecture, e.g., a neural network, that can be configured to process an image and embed the image in a latent embedding space, e.g., a multi-dimensional space of a different size or shape than the size or shape of the input image. In particular, the embedding model 340 can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers). As an example, the embedding model 340 can be a CNN, residual neural network (ResNet), Vision Transformer (ViT), etc.

The blending subsystem 330 can use the template face embedding 342 and the replacement face embedding 344 to determine a discrepancy 345, e.g., a distance between the template face embedding 342 and the replacement face embedding 344 of each template-replacement face-pair 350 in the latent embedding space, at each of the blending iterations. For example, the blending subsystem 330 can calculate the pointwise difference between the template face embedding 342 and the replacement face embedding 344 of the template-replacement face-pair 350. As another example, the blending subsystem 330 can calculate the cosine similarity between the template face embedding 342 and the replacement face embedding 344 of the template-replacement face-pair 250. As yet another example, the blending subsystem 330 can calculate a measure of divergence, e.g., the Kullback-Leibler divergence or the Wasserstein distance, between the template face embedding 342 and the replacement face embedding 344 of the template-replacement face-pair 350.

The blending subsystem 330 can then apply a blending function 352 based on the discrepancy calculated for the blending iteration. For example, the subsystem 330 can determine whether each face-pair discrepancy 345 satisfies a threshold criteria, e.g., is greater than or less than a threshold value. For a given face-pair, in response to determining that the face-pair discrepancy 345 satisfies the threshold criteria, the blending subsystem 330 can blend the replacement face with the template face using the blending function 352. In particular, the subsystem 330 can blend values of the pixels of the replacement face and values of the pixels of the template face in the aligned bounding box image 335 using the blending function 352. As another example, the subsystem 330 can determine whether an aggregated measure of the total face-pair discrepancy satisfies a threshold criteria. In this case, the subsystem 330 can blend values of the pixels of the each replacement face and values of the pixels of each template face in the aligned bounding box image 335 using the blending function 352.

In some cases, the blending function 352 is parameterized by a blending parameter value, e.g., a value that can be updated at each of the blending iterations. As an example, the blending function 352 can be a weighted average that depends on the blending parameter value, e.g., the updated pixel values of the aligned bounding box image 335 can be calculated as value[i][j]=$\alpha$*image 1[i][j]+(1−$\alpha$)*image 2[i][j], where i and j are used to index over the pixels in the portion of the aligned bounding box image 335 within the aligned template and replacement face bounding boxes. For example, the system can increase the blending parameter value $\alpha$ for a portion of the aligned bounding box image 335 corresponding with a given template-replacement face-pair, if the face-pair discrepancy 345 is less than a blending threshold value, e.g., to blend more aggressively when the embeddings 342, 344 are closer together in the embedding space, and can decrease the blending parameter value $\alpha$ if the discrepancy is greater than the blending threshold value, e.g., to blend less aggressively when the embeddings 342, 344 are further apart in the embedding space. In particular, modifying the blending parameter value based on the discrepancy 345 can ensure that the personalized image 370 is aesthetically consistent, e.g., that the replaced face does not look merely cut-and-pasted onto the template individual.

Figure 5:
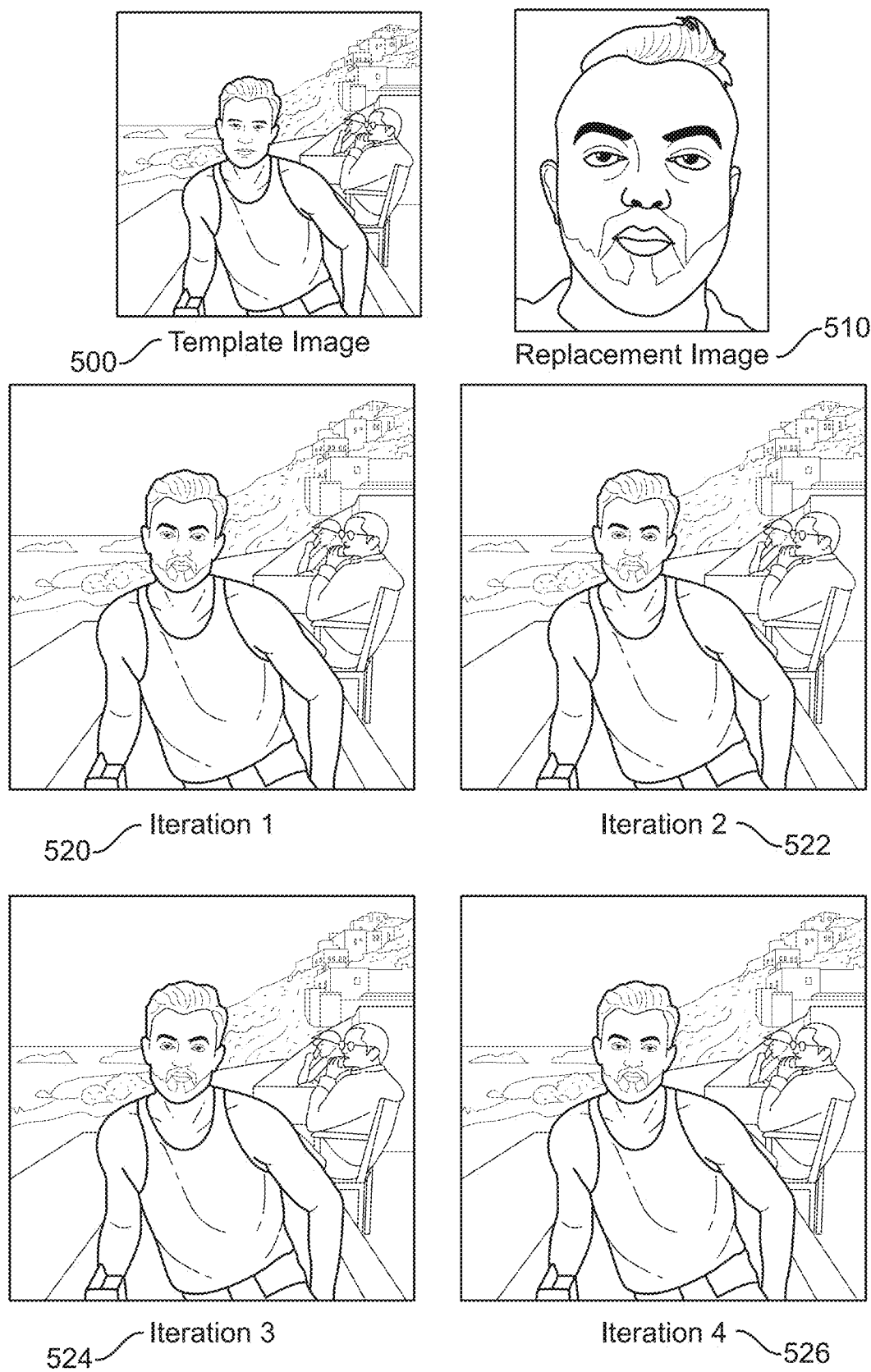
FIG. 5 illustrates example results at each iteration of an iterative faceswap performed using the example iterative personalization engine of FIG. 3.

The blending subsystem 330 can blend together a template-replacement face pair together as described at each of a number of blending iterations, e.g., 4, 10, or 20 iterations. Example results of four iterations of faceswapping are depicted in FIG. 5. At the final blending iteration, the blending subsystem 330 can provide an intermediate image 355 that can be postprocessed by the iterative personalization engine 300.

While discussed here within the context of faceswapping, in some examples, the iterative personalization engine 300 can be configured to additionally perform hair-replacing, e.g., the iterative personalization can include both faceswapping and hair-replacing. In this case, the engine 300 can also iteratively replace the template hair of the example individual with the replacement hair of the corresponding replacement individual by blending embeddings of the template and replacement hair at each of the number of iterations. In particular, the iterative personalization engine 300 can detect a bounding box around the template hair and a bounding box around the replacement hair and blend each respective hair-pair using a distance between hair embeddings using the blending subsystem 330, e.g., as described above with respect to iteratively blending a face-pair 350. In this case, the blending function 352 can be applied to both (i) the template face embedding 342 and replacement face embedding 344 and (ii) the template hair embedding and the replacement hair embedding.

Furthermore, the iterative personalization engine 300 can enhance the quality of the intermediate image 355, e.g., using a face restoration model 360. As another example, the iterative personalization engine 300 can harmonize the lighting in the intermediate image 255. In the particular example depicted, the engine 300 can both enhance and harmonize the intermediate image 355. In other cases, the iterative personalization engine 300 can enhance the quality of the overlapped bounding box image 335 at each iteration and then harmonize the intermediate image 355 generated from the final blending iteration.

In particular, the face restoration 360 and the harmonizer models 370 can have any appropriate machine learning architecture, e.g., a neural network, that can be configured to process the intermediate image 355. In particular, the models 360, 370 can have any appropriate number of neural network layers (e.g., 1 layer, 5 layers, or 10 layers) of any appropriate type (e.g., fully-connected layers, attention layers, convolutional layers, etc.) connected in any appropriate configuration (e.g., as a linear sequence of layers, or as a directed graph of layers).

As an example, the face restoration model 360 can be a generative facial prior GAN, e.g., as described in Wang, X., et. al. "Towards Real-World Blind Face Restoration with Generative Facial Prior" (arXiv:2101.04061v2), and the harmonizer model 370 can be a painterly image harmonization (PIH) model, e.g., as described in Niu, Li, et. al. "Painterly Image Harmonization by Learning from Painterly Objects" (arXiv:2312.10263v1). In this case, the harmonizer model 370 can process the intermediate image 355 and the selected template image 306 to detect the foreground of the intermediate image 355 and the background of the template image 306 using salient object detection, and can harmonize the lighting in the foreground and the background such that the foreground fits naturally with the background. An example of harmonizing the lighting in a generated image will be described in more detail with respect to FIG. 6.

After postprocessing with the face restoration model 360 and the harmonizer model 370, the iterative personalization engine 300 can provide the personalized image 270 to a user. For example, the personalized image 270 can include the user or someone the user knows in the place of a famous person. In this case, the user can use the personalized image 270 as part of a social media platform, e.g., a platform for sharing memes. As another example, the personalized image 270 can include the user in the place of an individual wearing one or more articles of clothing that the user aims to virtually try on.

Figure 4:
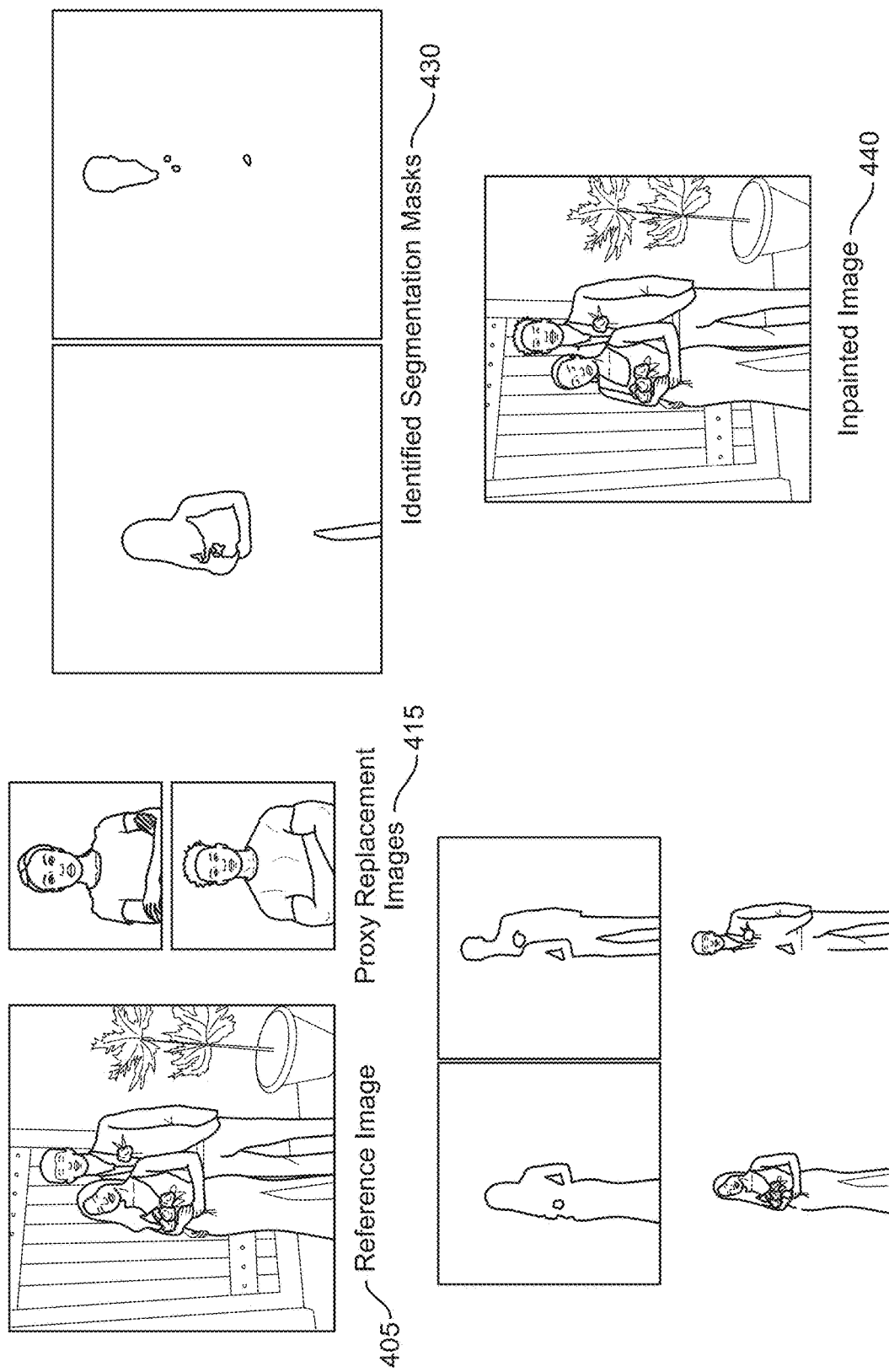
FIG. 4 is a further example of an inpainted image including two replacement individuals that were generated using a metadata comparison.

FIG. 4 is an example of an inpainted image generated for two example individuals using a reference image including two reference individuals, e.g., a prom couple. For example, the seamless image integration system 200 of FIG. 2 can generate the inpainted image 440 for the proxy replacement images 415 using the inpainting model 145.

In the particular example depicted, the reference individuals are from a set of example individual images that include individuals with a variety of skin-tones and genders. In particular, the system can detect metadata from the reference image 405 and the proxy replacement images 415, e.g., using a metadata model 210, and compare the metadata to determine the identified segmentation masks 430 for replacing.

In this case, the example individuals in the proxy replacement images 415 have a different skin-tone than the replacement individuals, but the genders align, e.g., there is a male and female individual in both the reference image 405 and the proxy replacement images 415. For example, after determining that there is a combination of the proxy replacement images 415 in the metadata comparison, the system can determine the reference-replacement individual pair. In the particular example depicted, the system has assigned the female proxy replacement image to replace the female reference individual and the male proxy replacement image to replace the male reference individual.

In this case, the system can detect segmentation masks from the reference image 405 and identify the relevant segmentation masks based on the metadata comparison, e.g., the system can designate the segmentation mask 420 for the skin and the face to be replaced 430 for both reference individuals in order to generate the inpainted image 440. As an example, the system can maintain the inpainted image 440 as a template image in a template image database, e.g., for further replacing. In particular, the system can identify a relevant template image that provides a likeness to one or more replacement individuals in a replacement image in order to perform faceswapping, hair-replacing, or both.

FIG. 5 illustrates example aligned bounding box image results at each iteration of an iterative faceswap performed using a template image with one individual and a replacement image with one individual. As an example, the iterative personalization engine 200 of FIG. 2 can perform the depicted faceswap.

For example, the system can obtain the template image 500, e.g., by identifying the template image 500 from a set of template images stored in a template image database and can receive the replacement image 510 for faceswapping from a user. In this case, the faceswapping engine can detect and align the bounding boxes for the template-replacement face-pair of the template individual in the template image 500 and the replacement individual in the replacement image 510.

After aligning the template face and the replacement face, the system can perform faceswapping at each of four depicted iterations e.g., resulting in the iteration 1 (520), iteration 2 (522), iteration 3 (524), and iteration 4 (526) images. In particular, the system can embed the template face and the replacement face, determine a discrepancy between the face embeddings, and apply a blending function based on the discrepancy at each iteration, e.g., as discussed in FIG. 3.

In the particular example depicted, the facial structure of the replacement individual in the replacement image 510 becomes sharper with each blending iteration. As an example, the replacement individual's beard is more pronounced at iteration 4 (526) than at iteration 1 (520), e.g., where the beard is more similar to the example individual's beard in the template image 500. As another example, facial landmarks, e.g., the jawline, the cheekbones, and the brow ridge of the replacement individual are more distinctive at iteration 4 (526), than at iteration 1 (520).

Figure 6:
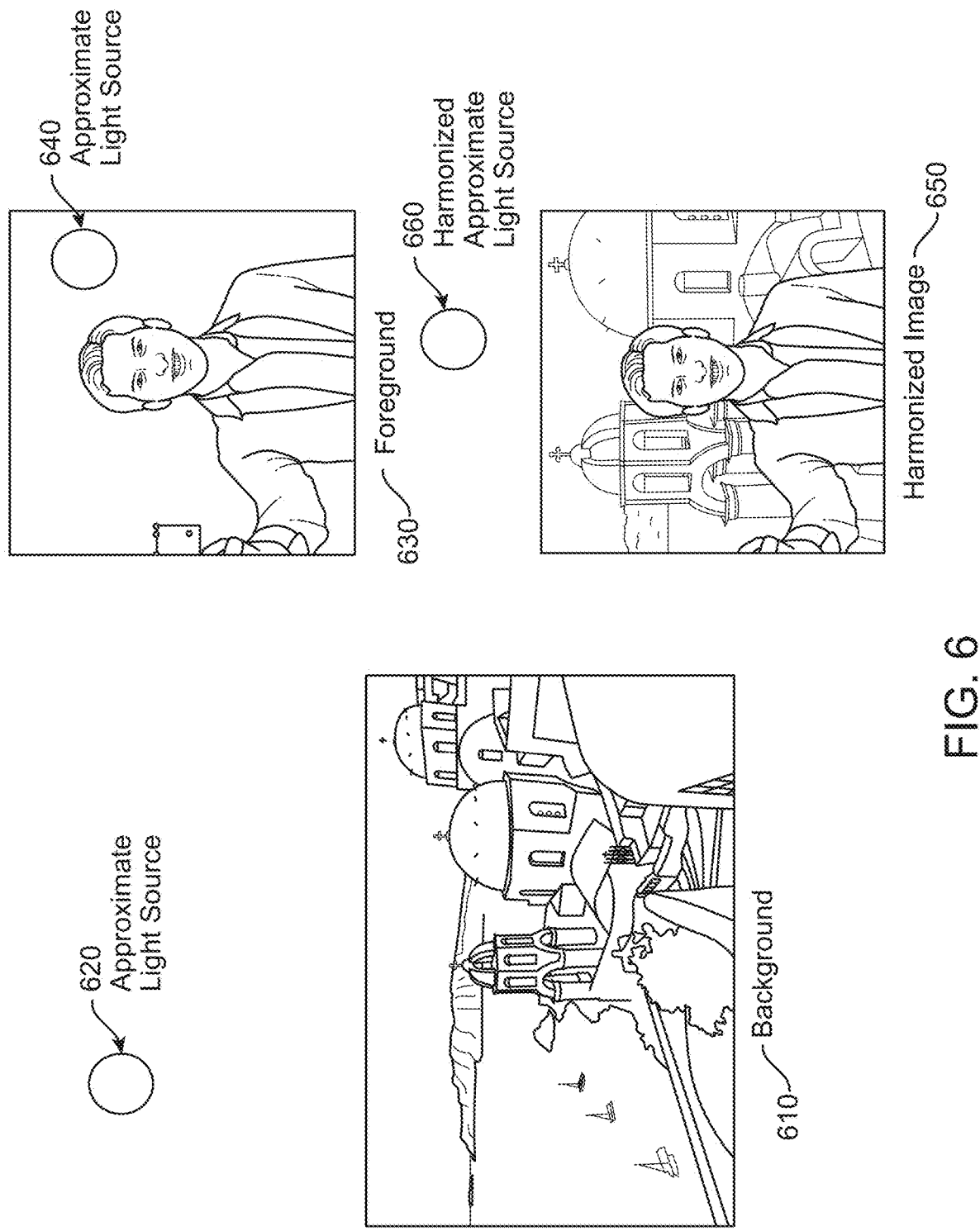
FIG. 6 depicts example harmonization results on an inpainted image.

FIG. 6 depicts an example result from applying a harmonizer model to a personalized image. In the particular example depicted, the system uses a painterly image harmonization (PIH) model as the harmonizer model to perform foreground 630 and background 610 detection of an intermediate image generated after the final iteration of faceswapping.

For example, the system can use a harmonizer model to ensure the aesthetic consistency of the generated output image. In some cases, the light source in the reference image can be in a differential spatial location with respect to the reference individual, than the light source in the replacement image. In the particular example depicted, the positioning of the light sources in the detected foreground 630 and the background 610 images are different: the approximate light source 640 in the foreground image 630 is located over the right shoulder of the replacement individual, e.g., based on the angle of the light falling on the replacement individual, and the approximate light source 620 in the background image 610 is located above and slightly to the left of the Santorini churches.

The system can use the PIH model to harmonize the lighting, e.g., to ensure that the angle of the incident light in the harmonized image 650 is aesthetically consistent. For example, the PIH model can determine a harmonized approximate light source 660 and generate and apply a brightness gradient over the foreground 620 and the background 630 images based on the approximate light source 660. The PIH model can then recombine the brightness-gradient altered foreground 620 and background 630 images to ensure aesthetic consistency in the harmonized image 650.

Figure 7:
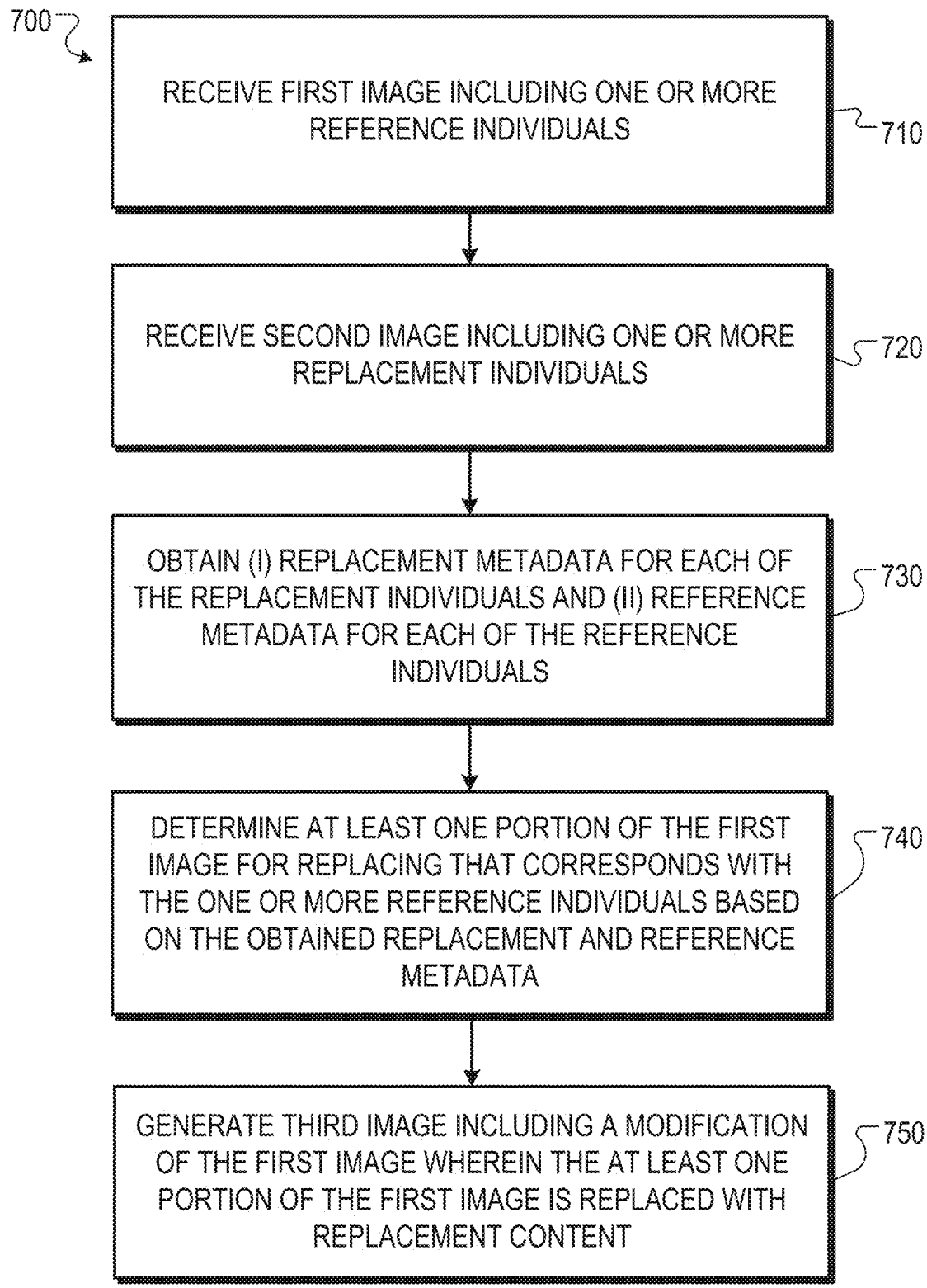
FIG. 7 is a flow diagram of an example process for using replacement content based on a metadata comparison.

FIG. 7 is a flow diagram of an example process for generating an image using replacement content based on a metadata comparison. For convenience, the process 700 will be described as being performed by a system of one or more computers located in one or more locations. For example, a seamless image integration system, e.g., the seamless image integration system 200 of FIG. 2, appropriately programmed in accordance with this specification, can perform the process 700.

The system can receive a first image including one or more reference individuals (step 710), and the system can receive a second image including one or more replacement individuals (step 720). As an example, the system can receive a first image including one or more famous individuals, e.g., a famous singer, a movie star, a politician, etc., and a second image including one or more of a user of the system 200, someone the user knows, e.g., a friend, a family member, a coworker, or knows of. In particular, the first image can include a background or scenario that a user wants to modify to include the likeness of one or more replacement individuals in, e.g., a scene from a movie, a top vacation destination, a meme, etc.

The system can obtain (i) replacement metadata for each of the replacement individuals in the second image and (ii) reference metadata for each of the reference individuals in the first image (step 730). As an example, race and gender can be metadata fields. As another example, age group, facial expression, and height can be metadata fields. For example, the system can process the second and the first image, respectively, using a metadata machine learning model to generate the respective replacement and reference metadata. As another example, the system can receive the replacement and reference metadata, e.g., as an input to the system or by identifying the corresponding metadata in a database that maintains metadata for previously processed replacement images.

The system can then determine at least one portion of the first image for replacing that corresponds with the one or more reference individuals based on the obtained replacement and reference metadata (step 740). In particular, the system can process the first image using an object detection machine learning model to identify a region of the first image corresponding to each of the one or more reference individuals and can extract a number of segmentation masks from each identified region of the first image, e.g., using a segmentation machine learning model. As an example, the segmentation masks can include segmentation masks representing face, skin, hair, and one or more articles of clothing.

The system can then compare the replacement and reference metadata that relates to each segmentation mask and identify one or more of the segmentation masks for replacing, e.g., inpainting, in accordance with the metadata comparison. In particular, the system can identify one or more of the segmentation masks based on at least one discrepancy between the replacement and reference metadata as the at least one portion of the first image for replacing. For example, the system can determine that a clothing mask for a dress can be inpainted for a male replacement individual, e.g., to replace the dress with a shirt and pants. As another example, the system can determine that a skin mask for a lighter-skinned reference individual can be replaced for a darker-skinned replacement individual. In some cases, the system can be additionally configured to determine the segmentation masks for replacing based on one or more user-set parameters, e.g., a user can specify whether an identification of a metadata discrepancy pertaining to a segmentation mask is designated for replacing based on one or more user preferences.

The system can generate a third image including a modification of the first image, wherein the at least one portion of the first image is replaced with replacement content (step 750), e.g., the inpainted image. In particular, the replacement content can be generated based on (i) the one or more replacement individuals, (ii) the replacement metadata, and (iii) the reference metadata. In particular, the system can generate the third image from a model input including the first image, a cropped image of the replacement individual, e.g., to remove unnecessary background information, the at least one portion of the first image for replacing, e.g., the one or more segmentation masks, and a text prompt that includes the replacement metadata using an inpainting machine learning model. In some cases, the system can additionally include a pose, e.g., a set of keypoints that represent the positioning of various joints of the reference individual, for each of the one or more reference individuals from the first image, as an input to the inpainting machine learning model. In this case, the system can process the first image using a pose estimation machine learning model to generate the pose.

As an example, the system can obtain a cropped image of each of the replacement individuals from the second image, e.g., the system can identify the region of the second image that includes each replacement individual using an object detection machine learning model and can crop the region to generate the cropped image. In some cases, the system can additionally resize the cropped image in accordance with the at least one portion of the first image for replacing. For example, the system can resize the cropped image to ensure that the size of the replacement individual's face in a particular cropped image is similar to the size of a corresponding reference individual's face.

For example, the inpainting machine learning model can be a stable diffusion machine learning model that has been configured to generate a high-quality image by updating a noisy image to match the intended image according to the data included in the model input. In the case that pose is included in the input to the inpainting machine learning model, the system can use the pose as spatial guidance to condition the generation of the third image using the stable diffusion machine learning model. In particular, the stable diffusion machine learning model can use the pose to guide the portions of the generated image that relate to the pose, e.g., to ensure that the positioning of various joints of the replacement individual align with the positioning of the various joints of the reference individual in the third image.

In some cases, the second image is selected from a set of example individual images, e.g., where the replacement individuals are example individuals from a representative sample of individuals, e.g., including a variety of races, genders, etc. In this case, the replacement metadata can be considered to be template metadata and the generated third image can be considered to be a template image, e.g., which can be used for further processing.

In particular, the system can generate a corresponding set of template images for each permutation of example individuals in the set of example individual images as the one or more reference individual(s) and can store the set of template images and the template metadata, e.g., in a template image database. For example, the template images can be identified in the case that one or more other users aims to replace content within the same reference image. As an example, the system can upsample each template image, e.g., using an upsampling model, to generate a high-quality example individual image that can be maintained for further replacing.

More specifically, the system can select an appropriate template image, e.g., in accordance with each example individual in the template image providing a likeness to each of the one or more corresponding replacement individuals in the replacement image based on the template and replacement metadata. The system can then extract a reference face segmentation mask for each reference individual face in the selected template image and can replace the reference face with a corresponding replacement segmentation mask for each replacement individual. As an example, the system can replace each of the template faces of the example individuals with a replacement face using an iterative faceswapping technique, as will be described in more detail with respect to FIG. 8.

Figure 8:
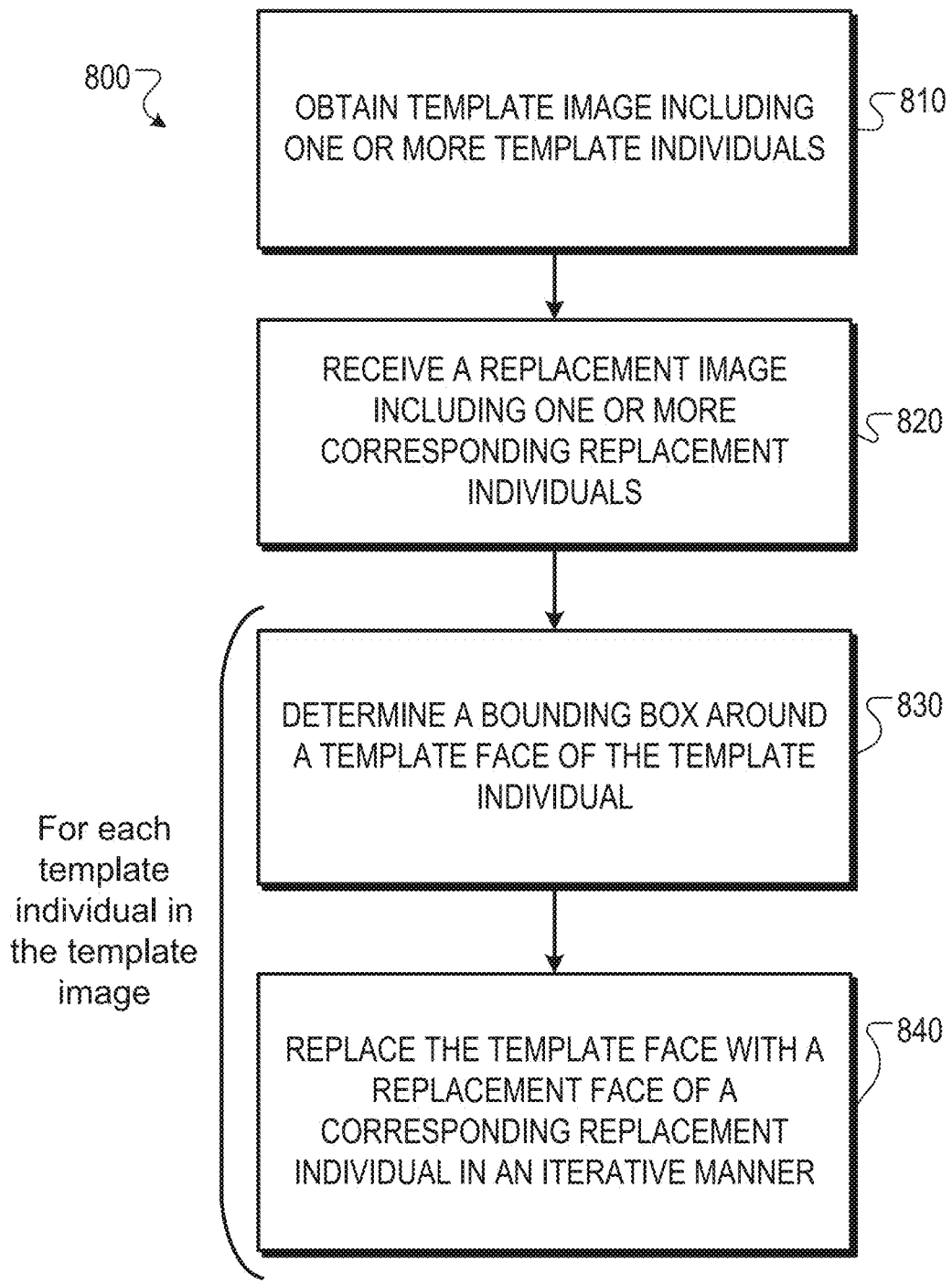
FIG. 8 is a flow diagram of an example process for iteratively replacing the face of a template individual with the face of a replacement individual.

FIG. 8 is a flow diagram of an example process for iteratively replacing a reference face with a replacement face. For convenience, the process 800 will be described as being performed by a system of one or more computers located in one or more locations. For example, an iterative personalization engine, e.g., the iterative personalization engine 300 of FIG. 3, appropriately programmed in accordance with this specification, can perform the process 800.

The system can obtain a template image including one or more template individuals (step 810), and the system can receive a replacement image including one or more corresponding replacement individuals (step 820). In particular, the system can obtain template metadata for each of the one or more template individuals and obtain corresponding replacement metadata for each of the one or more corresponding replacement individuals, e.g., where each template individual provides a likeness to a respective corresponding replacement individual. For example, the system can identify the template image and corresponding template metadata from a set of template images stored in a template database using the replacement metadata, e.g., to determine the template image that provides the greatest likeness to the one or more replacement individuals. In the case that the template image is not in the template database, the system can generate the set of template images including the template image. For example, the system or another system can generate the set of template images for each example individual image in a set of example individual images, e.g., using the process 700.

The system can then determine a bounding box around a template face of the template individual (step 830), and can replace the template face with a replacement face of a corresponding replacement individual in an iterative manner (step 840). In particular, the system can repeat steps 830 and 840 for each template individual in the template image.

For example, the system can identify a bounding box around the replacement face of the corresponding replacement individual and can align the template image and the replacement image by overlapping the bounding box around the template face with the bounding box around the replacement face. The system can then align the template image and the replacement image by overlapping the bounding boxes and can blend the replacement face and template face at each of a number of iterations, e.g., two iterations, four iterations, 10 iterations, etc. In particular, the system can determine a discrepancy between an embedding of the replacement face and an embedding of the template face, e.g., for each replacement-template face-pair, and can determine whether the discrepancy satisfies a threshold level. In the case that the discrepancy satisfies the threshold level, the system can blend the replacement face with the template face, e.g., using a blending function.

As an example, the system can blend the replacement face with the template face using a blending function parameterized by a blending parameter value and can update the blending parameter based at least on the discrepancy. For example, the system can increase the blending parameter value if the discrepancy is less than a blending threshold value, e.g., to more aggressively blend the replacement face with the template face when the images are closer together in the embedding space, and can decrease the blending parameter value if the discrepancy is less than a blending threshold value, e.g., to less aggressively blend the replacement face with the template face when the images are further apart in the embedding space. In particular, by updating the blending parameter value based on the discrepancy, the system can ensure that the generated image looks naturally integrated, e.g., aesthetically consistent, such that it is difficult to tell that the resultant image was modified to include the replacement face.

In some cases, the system can upsample an intermediate image generated by the blending at each iteration, e.g., using a face restoration model to generate an upsampled image. Furthermore, in some cases, the system can harmonize the upsampled image using a harmonizer model, e.g., at a final iteration. In this context, harmonizing the upsampled image refers to postprocessing the image to ensure it looks as integrated as possible. For example, the system can unify the lighting between the foreground and the background of the image by detecting a foreground of the upsampled image, e.g., the template individual with the replacement face, and by detecting the background of the template image. The system can then process the detected foreground and background using the harmonizer model to generate a harmonized image, e.g., with a realistic lighting profile, e.g., based on a harmonized light source position in the background.

While described here within the context of faceswapping, the iterative personalization engine can also perform a process similar to 800 to perform hair-replacing. In particular, for each template individual in the template image, the system can determine a bounding box around the template hair of the template individual and the replacement hair of the replacement individual and can replace the template hair with the replacement hair in an iterative manner, e.g., by blending according to a discrepancy between an embedding of the template hair and an embedding of the replacement hair.

For example, a portion or all of the operations for seamless image integration, etc. may be executed by a computer device and/or mobile computer device. As an example, the computing device can be, e.g., a laptop, desktop, workstation, personal digital assistant, server, blade server, mainframe, or any other appropriate computer. As an example, the mobile computing device can be, e.g., a personal digital assistant, tablet computing device, cellular telephone, smartphone, or any other similar computing device. Example components described here, their connections and relationships, and their functions, are meant to be examples only, and are not meant to limit implementations of the techniques described and/or claimed in this document.

The computing device can include a processor, memory, storage device, a high-speed interface connecting to memory and high-speed expansion ports, and a low-speed interface connecting to low-speed bus and storage device. Each of components described can be interconnected using various busses, and can be mounted on a common motherboard or in other manners as appropriate. As an example, the processor can process instructions for execution within the computing device, including instructions stored in memory or on storage device to display graphical data for a GUI on an external input/output device, including, e.g., a display coupled to a high-speed interface. In other implementations, multiple processors and/or multiple busses can be used, as appropriate, along with multiple memories and types of memory. Also, multiple computing devices can be connected, with each device providing portions of the necessary operations (e.g., as a server bank, a group of blade servers, or a multi-processor system).

Memory can be used to store data within the computing device. In one implementation, the memory is a volatile memory unit or units. In another implementation, the memory is a non-volatile memory unit or units. The memory also can be another form of computer-readable medium (e.g., a magnetic or optical disk). The memory may be non-transitory.

The computing device can also include a storage device capable of providing mass storage for the computing device. In one implementation, the storage device can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., that includes a memory, storage device, memory on processor, and the like.)

A high-speed controller can manage bandwidth-intensive operations for computing device, while a low-speed controller can manage lower bandwidth-intensive operations. Such allocation of functions is an example only. In one implementation, a high-speed controller is coupled to memory, a display (e.g., through a graphics processor or accelerator), and to high-speed expansion ports, which can accept various expansion cards (not shown). In the implementation, a low-speed controller is coupled to a storage device and low-speed expansion port. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

The computing device can be implemented in a number of different forms. For example, it can be implemented as standard server, or multiple times in a group of such servers. It also can be implemented as part of rack server system. In addition or as an alternative, it can be implemented in a personal computer (e.g., a laptop computer.) In some examples, components from the computing device can be combined with other components in a mobile device. Each of such devices can contain one or more of a computing device and a mobile device, and an entire system can be made up of multiple computing and mobile devices communicating with each other.

As another example, a computing device, e.g., a mobile computing device, can include a processor, memory, an input/output device (e.g., a display, communication interface, and transceiver among other components. The device also can be provided with a storage device, (e.g., a microdrive or other device) to provide additional storage. Each of the components can be interconnected using various buses, and several of the components can be mounted on a common motherboard or in other manners as appropriate.

A processor can execute instructions within computing device, including instructions stored in memory. The processor can be implemented as a chipset of chips that include separate and multiple analog and digital processors. The processor can provide, for example, for coordination of the other components of the computing device, e.g., control of user interfaces, applications run by the device, and wireless communication by the device.

For example, the processor can communicate with a user through a control interface and display interface coupled to a display. The display can be, for example, a TFT LCD (Thin-Film-Transistor Liquid Crystal Display) or an OLED (Organic Light Emitting Diode) display, or other appropriate display technology. The display interface can comprise appropriate circuitry for a driving display to present graphical and other data to a user. A control interface can receive commands from a user and convert them for submission to a processor. In addition, an external interface can communicate with the processor, so as to enable near area communication of the device with other devices. An external interface can provide, for example, for wired communication in some implementations, or for wireless communication in other implementations, and multiple interfaces also can be used.

A memory can store data within the computing device. The memory can be implemented as one or more of a computer-readable medium or media, a volatile memory unit or units, or a non-volatile memory unit or units. Expansion memory also can be provided and connected to the device through an expansion interface, which can include, for example, a SIMM (Single In Line Memory Module) card interface. Such expansion memory can provide extra storage space for the device, or also can store applications or other data for the device. Specifically, expansion memory can include instructions to carry out or supplement the processes described above, and can include secure data also. Thus, for example, expansion memory can be provided as a security module for device, and can be programmed with instructions that permit secure use of the device. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier can be a computer- or machine-readable medium (e.g., including memory, expansion memory, and/or memory on processor), which can be received, for example, over transceiver or external interface.

As an example, the computing device can communicate wirelessly through a communication interface, which can include digital signal processing circuitry where necessary. The communication interface can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through a radio-frequency transceiver. In addition, short-range communication can occur, e.g., using a Bluetooth®, WiFi, or other such transceiver (not shown). In addition, a GPS (Global Positioning System) receiver module can provide additional navigation- and location-related wireless data to the device, which can be used as appropriate by applications running on the device. Sensors and modules such as cameras, microphones, compasses, accelerators (for orientation sensing), etc. may be included in the device.

The computing device also can communicate audibly using an audio codec, which can receive spoken data from a user and convert it to usable digital data. The audio codec can likewise generate audible sound for a user, (e.g., through a speaker in a handset of the device.) Such sound can include sound from voice telephone calls, can include recorded sound (e.g., voice messages, music files, and the like) and also can include sound generated by applications operating on the device.

The computing device can be implemented in a number of different forms. For example, it can be implemented as cellular telephone. It also can be implemented as part of smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing-device implemented method comprising:
    receiving a first image comprising one or more reference individuals and a second image comprising one or more replacement individuals;
    obtaining replacement metadata for each of the one or more replacement individuals;
    obtaining reference metadata for each of the one or more reference individuals;
    determining, based on the obtained replacement metadata and reference metadata, at least one portion of the first image for replacing, the at least one portion corresponding with at least one portion of the one or more reference individuals; and
    generating a third image that comprises a modification of the first image, wherein the at least one portion of the first image is replaced with replacement content, the replacement content being generated based on (i) the one or more replacement individuals, (ii) the replacement metadata, and (iii) the reference metadata, and a portion of the replacement content being iteratively personalized by decreasing a discrepancy between an embedding of the portion of the replacement content and an embedding of a corresponding portion of reference content of the at least one portion of the first image.

2. The computing-device implemented method of claim 1, wherein determining the at least one portion of the first image for replacing comprises:
    processing the first image using an object detection machine learning model to identify a region of the first image corresponding to each of the one or more reference individuals;
    extracting a plurality of segmentation masks from each identified region of the first image;
    performing a comparison of the replacement and reference metadata that relates to each identified region; and
    identifying one or more of the plurality of segmentation masks from each identified region as the at least one portion of the first image for replacing in accordance with the comparison.

3. The computing-device implemented method of claim 2, wherein the plurality of segmentation masks comprise segmentation masks representing face, skin, hair, and one or more articles of clothing.

4. The computing-device implemented method of claim 2, wherein identifying one or more of the plurality of segmentation masks comprises identifying one or more segmentation masks based on at least one discrepancy between the replacement and reference metadata as the at least one portion of the first image for replacing.

5. The computing-device implemented method of claim 1, wherein generating the third image comprises:
    obtaining a cropped image from the second image comprising a replacement individual; and
    generating the third image from a model input comprising the first image, the cropped image, the at least one portion of the first image for replacing, and a text prompt comprising the replacement metadata using an inpainting machine learning model.

6. The computing-device implemented method of claim 5, wherein the at least one portion of the first image for replacing comprises one or more segmentation masks.

7. The computing-device implemented method of claim 5, wherein the inpainting machine learning model is a stable diffusion machine learning model.

8. The computing-device implemented method of claim 5, wherein obtaining the cropped image from the second image further comprises:
    identifying a region of the second image comprising the replacement individual from the second image using an object detection machine learning model; and
    cropping the region of the second image comprising the replacement individual to generate the cropped image.

9. The computing-device implemented method of claim 8, further comprising resizing the cropped image in accordance with the at least one portion of the first image for replacing.

10. The computing-device implemented method of claim 1, wherein generating the third image further comprises:
    generating a pose for each of the one or more reference individuals from the first image using a pose estimation machine learning model; and
    conditioning the generation of the third image using the pose.

11. The computing-device implemented method of claim 1, wherein obtaining the replacement metadata of the one or more replacement individuals comprises generating the replacement metadata by processing the second image using a metadata machine learning model, and wherein obtaining the reference metadata of the one or more reference individuals comprises generating the reference metadata by processing the first image using the metadata machine learning model.

12. The computing-device implemented method of claim 1, wherein the second image is selected from a set of example individual images, wherein the replacement individuals are example individuals, wherein the replacement metadata is template metadata, and wherein the third image comprises a generated template image.

13. The computing-device implemented method of claim 12, further comprising:
generating a corresponding set of template images for each example individual image in the set of example individual images; and
storing the set of template images and the template metadata in a template image database.

14. The computing-device implemented method of claim 13, wherein generating the corresponding set of template images further comprises upsampling each template image in the set of template images using an upsampling model.

15. The computing-device implemented method of claim 2, wherein identifying one or more of the plurality of segmentation masks comprises extracting a reference face segmentation mask for each reference individual face.

16. The computing-device implemented method of claim 15, further comprising:
extracting a replacement face segmentation mask for each replacement individual face; and
replacing a reference face with a corresponding replacement face using a respective pair of reference face segmentation mask and corresponding replacement segmentation mask for each reference individual.

17. A system comprising:
a computing device comprising:
a memory configured to store instructions; and
a processor to execute the instructions to perform operations comprising:
receiving a first image comprising one or more reference individuals and a second image comprising one or more replacement individuals;
obtaining replacement metadata for each of the one or more replacement individuals;
obtaining reference metadata for each of the one or more reference individuals;
determining, based on the obtained replacement metadata and reference metadata, at least one portion of the first image for replacing, the at least one portion corresponding with at least one portion of the one or more reference individuals; and
generating a third image that comprises a modification of the first image, wherein the at least one portion of the first image is replaced with replacement content, the replacement content being generated based on (i) the one or more replacement individuals, (ii) the replacement metadata, and (iii) the reference metadata, and a portion of the replacement content being iteratively personalized by decreasing a discrepancy between an embedding of the portion of the replacement content and an embedding of a corresponding portion of reference content of the at least one portion of the first image.

18. The system of claim 17, wherein determining the at least one portion of the first image for replacing comprises:
processing the first image using an object detection machine learning model to identify a region of the first image corresponding to each of the one or more reference individuals;
extracting a plurality of segmentation masks from each identified region of the first image;
performing a comparison of the replacement and reference metadata that relates to each identified region; and
identifying one or more of the plurality of segmentation masks from each identified region as the at least one portion of the first image for replacing in accordance with the comparison.

19. The system of claim 18, wherein identifying one or more of the plurality of segmentation masks comprises extracting a reference face segmentation mask for each reference individual face.

20. The system of claim 19, further comprising:
extracting a replacement face segmentation mask for each replacement individual face; and
replacing a reference face with a corresponding replacement face using a respective pair of reference face segmentation mask and corresponding replacement segmentation mask for each reference individual.

21. One or more non-transitory computer readable media storing instructions that are executable by a processing device, and upon such execution cause the processing device to perform operations comprising:
receiving a first image comprising one or more reference individuals and a second image comprising one or more replacement individuals;
obtaining replacement metadata for each of the one or more replacement individuals;
obtaining reference metadata for each of the one or more reference individuals;
determining, based on the obtained replacement metadata and reference metadata, at least one portion of the first image for replacing, the at least one portion corresponding with at least one portion of the one or more reference individuals; and
generating a third image that comprises a modification of the first image, wherein the at least one portion of the first image is replaced with replacement content, the replacement content being generated based on (i) the one or more replacement individuals, (ii) the replacement metadata, and (iii) the reference metadata, and a portion of the replacement content being iteratively personalized by decreasing a discrepancy between an embedding of the portion of the replacement content and an embedding of a corresponding portion of reference content of the at least one portion of the first image.

22. The non-transitory computer readable media of claim 21, wherein determining the at least one portion of the first image for replacing comprises:
processing the first image using an object detection machine learning model to identify a region of the first image corresponding to each of the one or more reference individuals;
extracting a plurality of segmentation masks from each identified region of the first image;
performing a comparison of the replacement and reference metadata that relates to each identified region; and identifying one or more of the plurality of segmentation masks from each identified region as the at least one portion of the first image for replacing in accordance with the comparison.

\* \* \* \* \*